United States Patent

Buij et al.

[11] Patent Number: 5,962,985
[45] Date of Patent: Oct. 5, 1999

[54] DC/AC CONVERTER WITH IMPROVED STARTER CIRCUIT

[75] Inventors: Arnold W. Buij; Hendricus F. P. Michiels, both of Eindhoven, Netherlands

[73] Assignee: U.S. Philips Corporation, New York, N.Y.

[21] Appl. No.: 09/072,112

[22] Filed: May 4, 1998

[30] Foreign Application Priority Data

May 7, 1997 [EP] European Pat. Off. ............. 97201378

[51] Int. Cl.⁶ .................................................. H05B 37/02
[52] U.S. Cl. .................. 315/224; 315/276; 315/DIG. 2; 315/DIG. 5
[58] Field of Search ...................... 315/291, 219, 315/307, 209 R, DIG. 5, DIG. 7, DIG. 2, 224, 200 R, 276, 283, 287

[56] References Cited

U.S. PATENT DOCUMENTS 4,748,383  5/1988  Houkes ................................. 315/248

Primary Examiner—David H. Vu
Attorney, Agent, or Firm—Bernard Franzblau

[57] ABSTRACT

A circuit arrangement for operating a discharge lamp comprises a self-oscillating DC/AC converter (II) provided with a series arrangement of a first and a second switching element between a first and a second input terminal (2, 2') for connection to a DC voltage source (III). The series arrangement supplies an alternating current Ib to a load branch having output terminals for connection of the discharge lamp during nominal operation. The circuit arrangement is in addition provided with a starter circuit ST for generating a DC voltage component between the control electrode (1c') and the main electrode (1a') of the second switching element (1'). The starter circuit also include apparatus which comprise an auxiliary switch (25) that brings the first switching element (1) into a conducting state if the amplitude of the alternating current Ib is low compared with its amplitude during nominal operation. This apparatus prevents damage to the switching elements and promotes the initiation of the nominal operational state.

14 Claims, 1 Drawing Sheet

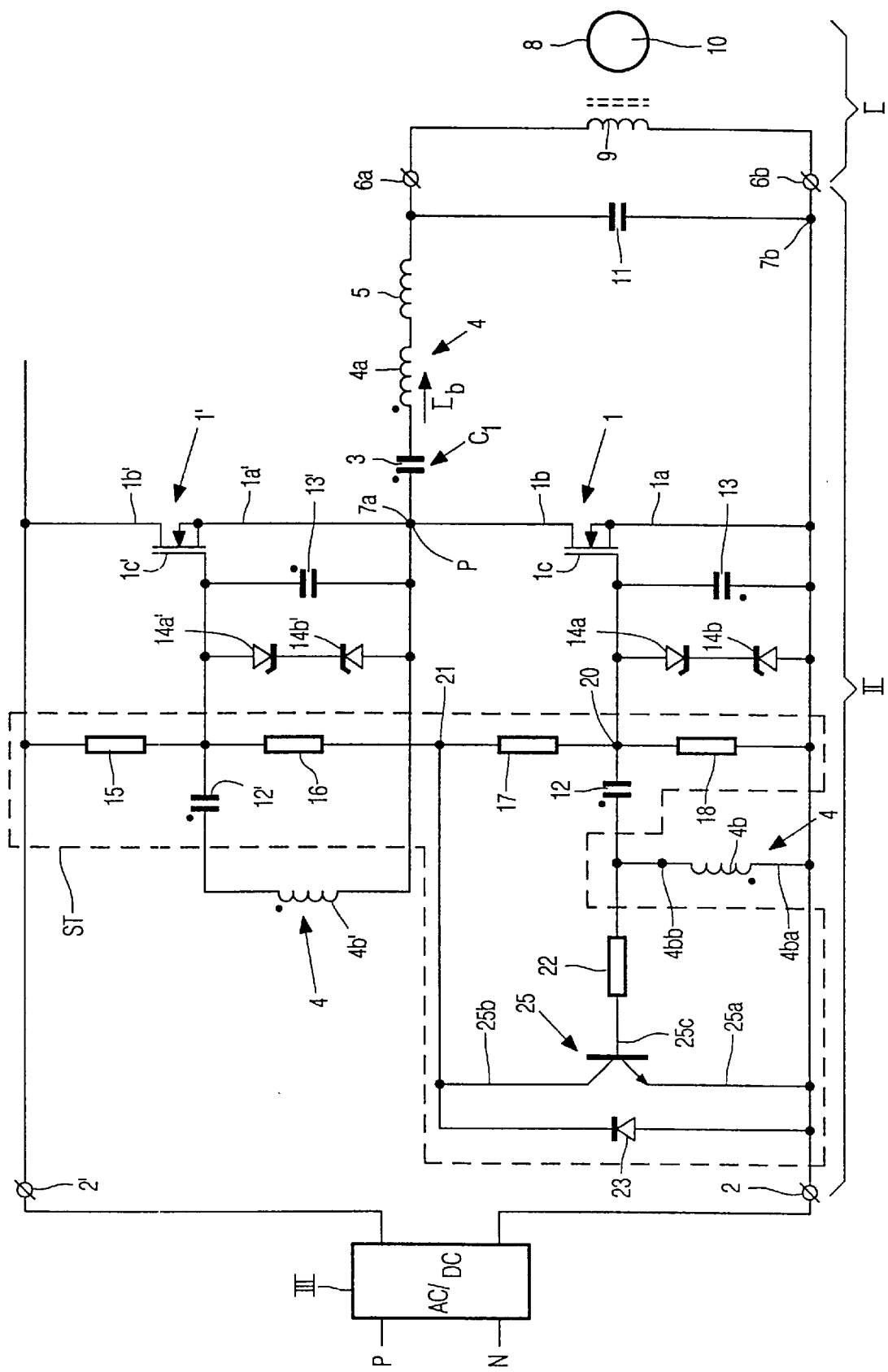

DC/AC CONVERTER WITH IMPROVED STARTER CIRCUIT

BACKGROUND OF THE INVENTION

This invention relates to a circuit arrangement for operating a discharge lamp, comprising a self-oscillating DC/AC converter provided with:

a series arrangement of a first and a second switching element coupled between a first and a second input terminal for connection to a DC voltage source, which series arrangement during nominal lamp operation supplies an alternating current Ib to a load branch which comprises at least first capacitive means, inductive means, and output terminals for connection of the discharge lamp, a first end of the load branch is connected to a junction point situated in the series arrangement between the first and the second switching element and a second end is connected to an input terminal, switching elements each of which has a control electrode and a main electrode to which a control circuit is connected equipped with means S and means S' for the generation of a control signal from the alternating current Ib for the first and the second switching element respectively, and a starter circuit ST comprising means for generating a DC voltage component between the control electrode and the main electrode of the second switching element.

Such a circuit arrangement is known from U.S. Pat. No. 4,748,383. The circuit is designed for an electrodeless discharge lamp provided with a coil and a discharge vessel. During nominal operation, the coil generates a high-frequency magnetic field which maintains an electric discharge in the discharge vessel. The coil is connected to the output terminals of the load branch. The output terminals are shunted by a series arrangement of a capacitor and a primary winding of a transformer. The control circuit of each of the switching elements comprises a secondary winding of the transformer. The primary winding and the secondary windings of the transformer form the means for generating a control signal from the alternating current Ib. The means for generating a DC voltage component between the control electrode and the main electrode of the second switching element are formed by resistive means between the second input terminal and the control electrode of the second switching element and second capacitive means which are connected in series with the means for generating a control signal.

After the circuit arrangement has been switched on, a current flows through the resistive means of the starter circuit to the control electrode of the second switching element, so that the latter enters a conducting state. Then a current flows through the second switching element, through the first capacitive means, and through the primary winding of the transformer. The first capacitive means are charged thereby. The average voltage at a junction point P rises as a result of this from zero to the value which it has during nominal operation. When the DC/AC converter starts oscillating during the charging process, the amplitude of these oscillations is initially so low that the resulting current through the load branch is a variable direct current. While the second switching element is in the non-conducting state, the first switching element must then conduct the current in the reverse direction. A subsequent reversal of the current through the load branch then initiates a recovery interval of the first switching element, such that a peak current arises through the series arrangement. An excessive value of the peak current may lead to damage of the switching elements. To avoid this, it is necessary to choose the capacitance value of the first capacitive means to be comparatively low. A low capacitance value, however, has the disadvantage that the time available for reaching a nominal operational condition is short. It may occur in that case that the first capacitive means have already been charged before an oscillation has established itself. This renders the known circuit arrangement less suitable for operation at comparatively low frequencies, for example at frequencies lower than 100 kHz.

The start of nominal operation may also not establish itself in the case of a too slow rise in the voltage between the input terminals of the DC/AC converter. The strength of the current conducted by the second switching element during charging of the first capacitive means is too low then, and the gain of the switching element is thus insufficient for realizing a satisfactory resonant amplification. If a nominal operational condition fails to arise, the DC/AC converter will end up in a state in which the first switching element is non-conducting and the second one is conducting. In that state there will be no more current flowing through the load branch after the first capacitive means have been charged.

SUMMARY OF THE INVENTION

It is an object of the invention to provide a measure in a circuit arrangement of the kind described in the opening paragraph which counteracts damage to the switching elements and which promotes the initiation of the nominal operational state. According to the invention, the circuit arrangement is for this purpose characterized in that the starter circuit ST is in addition provided with auxiliary means for placing the first switching element in a conducting state at an amplitude of the alternating current Ib which is low with respect to its amplitude during nominal operation, said auxiliary means comprising an auxiliary switching element. Since the first switching element is also brought into a conducting state after the circuit arrangement has been switched on, the current can now flow through the second switching element not only via the load branch but also via the first switching element. Noise which is intrinsically present in the conduction pattern of the switching elements gives rise to fluctuations in the current through the load branch. These fluctuations are amplified, whereby an oscillation is generated whose amplitude rises gradually until the DC/AC converter has reached a nominal operational state. The switching elements are alternately conducting in the nominal operational state of the DC/AC converter. It is accordingly surprising that achieving the nominal operational state in the circuit arrangement according to the invention is promoted by the fact that the switching elements are brought simultaneously into a conducting state. The time available for achieving nominal operation in the circuit arrangement according to the invention is not limited by the first capacitive means. When the amplitude is sufficiently high, for example at least two thirds of the amplitude during nominal operation, the activity of the means M will cease. The state of the first switching element is exclusively determined by its control circuit S from then on.

It is noted that international patent application IB 97/00277, not yet published, describes a circuit arrangement with a self-oscillating DC/AC converter where a pulsatory voltage is applied between the control electrode and the main electrode of the first switching element upon switching-on of the circuit arrangement. This pulsatory voltage is not dependent on the amplitude of the alternating current. An auxiliary switching element is absent.

The embodiment of the circuit arrangement according to the invention as defined in claim 2 has the advantage that the control signal of the auxiliary switching element can be realized by simple means in that the range of the magnitude of the control signal of the first switching element corresponds to the range required for switching the auxiliary switching element.

A practical realization of the embodiment defined in claim 2 is formulated in claim 3. When the auxiliary switching element is in the non-conducting state, while the alternating current Ib has a comparatively low amplitude, a DC voltage component bringing the first switching element into a conducting state will arise across the second branch of the voltage divider which extends between the control electrode and the first input terminal. The moment the amplitude of the alternating current Ib is high enough, the auxiliary switching element is brought into a conducting state by means of the signal which it receives at its control electrode. The common junction point of the first and the second partial branch of the first branch of the voltage divider then has the potential of the first input terminal, whereby the DC voltage component between the control electrode and the first input terminal is eliminated.

Alternatively, the auxiliary means may form a branch between the second input terminal and the control electrode of the first switching element, the auxiliary switching element being connected in series with resistive means therein. In this embodiment, the auxiliary switching element is brought into a conducting state immediately after switching-on, so that a DC voltage component is applied to the control electrode of the first switching element via said branch. As soon as the amplitude of the alternating current Ib is sufficiently high, the auxiliary switching element is brought into the non-conducting state, whereby the DC voltage component is eliminated.

A parasitic coupling may arise between the auxiliary switching element and the series arrangement comprising the first and the second switching element, especially in the case of a compact arrangement of the components of the circuit. The embodiment of claim 4 avoids the risk that a voltage may then arise at the control electrode of the first switching element which causes the latter to become non-conducting.

Claim 5 describes a practical embodiment for generating a control signal from the alternating current Ib. The primary winding of the transformer shunts, for example, the output terminals of the load branch, for example in series with one or several other components. Alternatively, the primary winding of the transformer may be included in series with the output terminals. In a modification of this embodiment, the control signals are generated from the alternating current Ib by means of optocouplers.

The DC/AC converter may be constructed as a full half-bridge circuit, where the first capacitive means comprise a first capacitive impedance of which one side forms the second end of the load branch and which together with a second capacitive impedance forms an additional series arrangement between the input terminals. In an alternative embodiment, the DC/AC converter is an incomplete half-bridge circuit in which the first capacitive means comprise a single capacitive impedance.

BRIEF DESCRIPTION OF THE DRAWING

These and other aspects of the circuit arrangement will be explained in more detail with reference to the drawing, in which the sole FIGURE shows an embodiment.

DESCRIPTION OF THE PREFERRED EMBODIMENTS

The drawing shows a circuit arrangement for operating a discharge lamp I provided with a self-oscillating DC/AC converter II. The DC/AC converter II has a first and a second input terminal 2, 2' for connection to a DC voltage source III. The DC voltage source here is an AC/DC converter with input terminals for connection to poles P, N of the public mains. The DC/AC converter is provided with a series arrangement of a first and a second switching element 1, 1' between tile first and the second input terminal 2, 2'. A main electrode 1a of the first switching element is connected to the first input terminal 2. A further main electrode 1b of the first switching element 1 is connected to a main electrode 1a' of the second switching element 1'. A further main electrode 1b' of the second switching element 1' is connected to the second input terminal 2'. The series arrangement (1, 1') has a junction point P between the first and the second switching element 1, 1'. The series arrangement supplies an alternating current Ib to a load branch during nominal operation, with a frequency of approximately 3 MHz in this case. The load branch comprises first capacitive means C1 formed by a capacitive impedance 3, inductive means comprising a primary winding 4a of a transformer 4 and an inductive impedance 5, and output terminals 6a, 6b for connection of the discharge lamp I. In an embodiment, the inductive impedance 5 and the primary winding 4a of the transformer 4 are integrated. The capacitive impedance 3, the primary winding 4a of the transformer 4, and the inductive impedance 5 are connected in series with one another between the junction point P in the series arrangement (1, 1') and one of the output terminals 6a. The other output terminal 6b is connected to the first input terminal 2. One side of the capacitive impedance 3 here forms the first end 7a of the load branch which is connected to the junction point P. The point P here is the connection between the further main electrode 1b of the first switching element 1 and the main electrode 1a' of the second switching element 1'. Output terminal 6b forms the second end 7b of the load branch which is connected to an input terminal 2. A discharge lamp I is connected to the output terminals 6a, 6b. The discharge lamp I here is a low-pressure mercury discharge lamp with a discharge vessel 8, which surrounds a discharge space 10, and with a coil 9. The coil 9 generates an alternating magnetic field for maintaining an electric discharge in the discharge space 10. The output terminals 6a, 6b are shunted by a capacitive impedance 11. The capacitive impedance 11 forms a resonant circuit together with inductive impedance 5 and coil 9 of the discharge lamp I.

In an alternative embodiment, the lamp I has electrodes instead of a coil, inside or outside of the discharge vessel, for maintaining an electric discharge. The electrodes then each have a current supply conductor to connect them to the output terminals of the DC/AC converter.

A control circuit comprising means for generating a control signal from the alternating current Ib is connected to the control electrode 1c and the main electrode 1a of the first switching element 1. The control signal generating means are formed by a secondary winding 4b of a transformer 4 in this case. The control circuit further comprises a capacitive impedance 13 and breakdown elements 14a, 14b. An end 4ba of the secondary winding 4b is connected to the main electrode 1a of the first switching element 1. A further end 4bb of the secondary winding 4b is connected to the control electrode 1c of the first switching element 1 via a capacitive impedance 12. The capacitive impedance 12 forms part of the starter circuit ST which will be described further below. The capacitive impedance 13, which shunts the control electrode 1c and the main electrode 1a of the first switching element 1, forms a resonant circuit together with the secondary winding 4b of the transformer 4. The control electrode 1c and the main electrode 1a of the first switching element 1 are in addition shunted by the breakdown elements 14a, 14b which are connected in series in mutually opposed directions. The breakdown elements protect the switching elements 1, 1' against an excessive voltage at their control electrodes 1c, 1c'. Components of the control circuit of the second switching element 1' corresponding to those of the first switching element 1 have reference symbols to which an accent sign (') has been added. The control circuit of the second switching element 1' differs from that of the first in that the voltage generated in the secondary winding 4b' has a polarity which is opposed to that in the secondary winding 4b.

The circuit arrangement according to the invention in addition comprises a starter circuit ST with means for generating a DC voltage component between the control electrode 1c' and the main electrode 1a' of the second switching element 1'. In the embodiment shown, these means comprise a resistive impedance 15 and a capacitive impedance 12'. The resistive impedance 15 is connected between the second input terminal 2' and the control electrode 1c' of the second switching element 1'. The resistive impedance 15 also forms a part of the switching means to be described further below. Capacitive impedance 12' is connected in series with the means for generating a control signal, formed by the secondary winding 4b' of the transformer, between the control electrode 1c' and the main electrode 1a' of the second switching element 1'.

The starter circuit ST is in addition provided with switching means for placing the first switching element in a conducting state when the amplitude of the alternating current Ib is low compared with its amplitude during nominal operation. The switching means comprise an auxiliary switching element 25.

The switching means also comprise a voltage divider 15–18, a unidirectional element 23, a resistive impedance 22, and a capacitive impedance 12.

The voltage divider 15–18 shunts the input terminals and comprises a first branch formed by a series arrangement of the resistive impedances 15, 16, and 17, and a second branch formed by resistive impedance 18. The branches have a common junction point 20 which is connected to the control electrode 1c of the first switching element 1. The first branch has a first partial branch formed by the resistive impedances 15 and 16 connected to the second input terminal 2'. A second partial branch formed by resistive impedance 17 is connected to the common junction point 20 of the branches. The partial branches have a common junction point 21 which is connected to the first input terminal 2 via the auxiliary switching element 25.

The auxiliary switching element 25 receives a further control signal which is dependent on the alternating current Ib. The auxiliary switching element 25 here receives its further control signal from the control circuit of the first switching element 1 in that the control electrode 25c of the auxiliary switching element 25 is connected to an end 4bb of the secondary winding 4b of the transformer 4 via resistive impedance 22.

The auxiliary switching element 25 is shunted by a unidirectional element 23 connected anti-parallel thereto. The unidirectional element 23 is included with reverse orientation in a branch 15, 16, 23 between the first and the second input terminal 2, 2'.

The circuit arrangement shown operates as follows. When a DC voltage is applied to the input terminals 2, 2', a voltage is applied to the control electrodes 1c, 1c' of the first and second switching elements 1, 1' by means of voltage divider 15–18, which brings these switching elements into a conducting state. This causes a current to flow through the two switching elements. The current flowing through each of the switching elements is subject to fluctuations. The differential current supplied to the load branch accordingly also exhibits fluctuations. A control signal is generated from these fluctuations via the transformer 4, which influences the conduction states of the switching elements 1, 1'. The fluctuations are amplified thereby, so that an oscillation is generated which causes the amplitude of the voltage at junction point P to rise gradually. Since the two switching elements are initially both conducting, the generation of an oscillation can not be blocked by the fact that the first capacitive means C1 become charged. The increase in amplitude of the voltage at junction point P of the series arrangement 1, 1' does not stop until that the moment that the conduction states of the switching elements 1, 1' alternate between substantially entirely conducting and substantially entirely non-conducting. Then the DC/AC converter has entered an operational state in which the voltage at junction point P varies in a substantially square-wave mode between the voltage of the first input terminal 2 and that of the second input terminal 2'. Given a sufficiently high amplitude of the alternating current Ib, the further control signal will bring the auxiliary switching element 25 into a conducting state, so that the common junction point 21 of the first and the second partial branch of the voltage divider assumes the voltage of the first input terminal. The DC voltage component between the control electrode 1c and the main electrode 1a of the first switching element 1 then ceases to exist.

Since the circuit arrangement described here is operated at a high frequency, the further control signal for the auxiliary switching element 25 can be generated from the control circuit of the first switching element 1 by very simple means. The resistive impedance 22, which limits the control signal, can suffice here. Damage to the auxiliary switching element is prevented thereby. The auxiliary switching element 25 is saturated during nominal operation at the high frequency at which the DC/AC converter is operated here, so that it remains conducting during both phases of the further control signal. Additional means are necessary for generating the further control signal in the case of operation at lower frequencies, for example a frequency of a few tens of kHz. These additional means comprise, for example, a unidirectional element in series with the resistive impedance 22 and a capacitive element which shunts the electrodes 25c and 25a. In a practical realization of the above circuit arrangement, the resistive impedances 15 and 16 each have a resistance value of 1 MΩ. The resistive impedances 17 and 18 each have a resistance value of 20 KΩ. The resistance value of resistive impedance 22 is also 20 KΩ. Capacitive impedance 3 and capacitive impedance 11 have respective capacitance values of 100 nF and 680 pF. The capacitive impedances 12 and 12' each has a capacitance value of 47 nF. The capacitive impedances 13 and 13' have a capacitance value of 2.2 nF. The inductive impedance 5 and coil 9 have respective self-inductance values of 30 $\mu$H and 8 $\mu$H. The breakdown elements 14a, 14b, 14a', 14b' are each constructed as a zener diode with a breakdown voltage of 10 V. This value is chosen such that breakdown does occur before lamp ignition, but not during lamp operation. A transistor of the type BC 848 is used as the auxiliary switching element 25. The unidirectional element 23 is constructed as a diode of the type 1N4148. The first and the second switching element are MOSFETs, type IRFU420. The transformer 4 has a torus-shaped core of soft-magnetic material. The windings 4a, 4b, 4b' have six turns each. The self-inductance of the transformer is 1 $\mu$H. The electrodeless low-pressure mercury discharge lamp I dissipates a power of 20 W in the operational state.

The switching-on behavior of the circuit arrangement according to the invention was compared with that of a circuit arrangement not according to the invention in which the auxiliary switching means are absent. To this end, the two circuit arrangements were connected to an AC voltage supply of which the voltage was interrupted at irregular intervals. Nominal operation was not re-instated several times with the circuit arrangement not according to the invention. The circuit arrangement according to the invention caused a reliable initiation of the nominal operational condition each time.

We claim:

1. A circuit arrangement for operating a discharge lamp comprising: a self-oscillating DC/AC converter (II) including:
   a series arrangement of a first switching element and a second switching element connected between a first input terminal and a second input terminal for connection to a DC voltage source,
   wherein said series arrangement, during nominal operation, supplies an alternating current (Ib) to a load branch which comprises at least first capacitive means, inductive means, and output terminals for connection of the discharge lamp,
   the load branch having a first end connected to a junction point situated in the series arrangement between the first and the second switching elements, and a second end connected to one of the input terminals,
   wherein the switching elements each has a control electrode and a main electrode to which a control circuit is connected having means for the generation from the alternating current (Ib) of a control signal for the first and the second switching elements respectively,
   a starter circuit comprising means for generating a DC voltage component between the control electrode and the main electrode of the second switching element, and wherein the starter circuit further comprises auxiliary means for placing the first switching element in a conducting state at an amplitude of the alternating current (Ib) which is low with respect to its amplitude during nominal operation, said auxiliary means comprising an auxiliary switching element.

2. A circuit arrangement as claimed in claim 1, characterized in that the auxiliary switching element is controlled by a further control signal originating from the control circuit of the first switching element.

3. A circuit arrangement as claimed in claim 1, characterized in that the auxiliary means further comprise a voltage divider which shunts the input terminals and which comprises a first branch and a second branch which have a common junction point connected to the control electrode of the first switching element, said first branch having a first partial branch which is connected to the second input terminal and a second partial branch which is connected to the common junction point of said branches, and the partial branches have a common junction point connected to the first input terminal via the auxiliary switching element.

4. A circuit arrangement as claimed in claim 3, characterized in that the auxiliary switching element is shunted by a reverse oriented unidirectional element connected in a branch between the first and the second input terminal.

5. A circuit arrangement as claimed in claim 1, characterized in that the means for generating the control signal from the alternating current (Ib) comprise a secondary winding of a transformer which has a primary winding in the load branch.

6. A circuit arrangement as claimed in claim 1 wherein, during a start-up phase of the DC/AC converter, said auxiliary switching element is controlled into a cut-off state as long as the alternating current (Ib) is below said low amplitude, whereby both of said first and second switching elements conduct current simultaneously.

7. A circuit arrangement as claimed in claim 6 wherein said auxiliary switching element is controlled into a conducting state as long as the alternating current (Ib) is at or above said low amplitude, whereby said first and second switching elements receive the control signal that alternately switches them on and off.

8. A circuit arrangement as claimed in claim 1 wherein the load branch further comprises second capacitive means in shunt with the output connection terminals for the discharge lamp, said second capacitive means and said inductive means forming a resonant circuit.

9. A circuit arrangement as claimed in claim 1 further comprising a second capacitive means coupled to the control electrode and main electrode of the first switching element, and said means for the generation of the control signal comprises a transformer having a primary winding connected in the load branch in series with the inductive means and a secondary winding coupled to the control electrode and main electrode of the first switching element, wherein the second capacitive means and said secondary winding form a resonant circuit.

10. A circuit arrangement as claimed in claim 9 further comprising voltage-breakdown means connected to the control electrode and said main electrode of the first switching element.

11. A circuit arrangement as claimed in claim 1 wherein said starter circuit includes means for applying a further DC voltage to the control electrode of the first switching element during a start-up phase when the amplitude of the alternating current (Ib) is below said low amplitude, and said auxiliary switching element is controlled into a cut-off state as long as the alternating current (Ib) is below said low amplitude, and is coupled to the control electrode and said main electrode of the first switching element so that, when the auxiliary switching element is conducting, it effectively removes the further DC voltage from the control electrode of the first switching element.

12. A circuit arrangement as claimed in claim 1 wherein said auxiliary switching element is coupled to the control electrodes of the first and second switching elements and is controlled into a conducting state as long as the alternating current (Ib) is at or above said low amplitude, whereby said auxiliary switching element remains conductive while the first and second switching elements receive the control signal that alternately switches them on and off.

13. A circuit arrangement as claimed in claim 1 wherein said auxiliary switching element is coupled to the control electrodes of the first and second switching elements, and further comprising a diode connected in anti-parallel with the auxiliary switching element.

14. A circuit arrangement as claimed in claim 1 wherein said auxiliary switching element is coupled to the control electrodes of the first and second switching elements and is controlled by the control signal determined by the alternating current (Ib) in the load branch.

* * * * *